United States Patent Office 2,756,250
Patented July 24, 1956

2,756,250

ALKYL AMIDO PYRO-PHOSPHORUS INSECTICIDES

Harry W. Coover, Jr., Kingsport, Tenn., assignor to Eastman Kodak Company, Rochester, N. Y., a corporation of New Jersey No Drawing. Application March 9, 1953, Serial No. 341,380

2 Claims. (Cl. 260—461)

This invention is concerned with organic phosphorous-nitrogen-compounds which are formed by the process of reacting an alkylamidophosphate with an organic acid anhydride.

In the past, organic phosphorous compounds used as insecticides have been formed by a condensation of phosphorus oxy chlorides with phosphorus alkyl esters to form alkyl substituted amido pyrophosphates. Compounds of this nature have also been formed by reacting phosphorus oxy-chloride with water and pyridine. However, these processes required the preparation of phosphorus oxy-chloride as a starting material, and therefore, proved complicated and expensive.

I have discovered a new and unexpected method of producing these phosphorus compounds without requiring the formation of the phosphorus oxy-chloride. I have discovered that treating an alklyamidophosphate with an organic acid anhydride results in the condensation of two molecules of the alkylamidophosphate and the resulting formation of two molecules of the methyl ester of the organic acid. For examples, when one mole of methoxy-(bis-dimethylamido)phosphine oxide is reacted with one-half mole of acetic anhydride, there is obtained one mole of methyl acetate plus an organic phosphorus compound containing one less methyl group per phosphorus molecule. The structure of the phosphorus compound is bis-(N,N-tetramethyldiamido)-pyrophosphate.

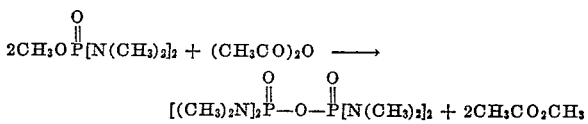

If the phosphate contains two alkyl groups such as dimethylamido-bis-methoxyphosphine oxide, the reaction product is mainly dimethyl-bis-(N,N-dimethylamido)-pyrophosphate as follows:

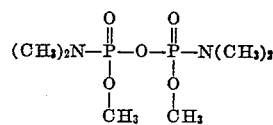

If this reaction product is reacted with more acetic anhydride, more methyl acetate is formed, and the reaction product contains still fewer methyl groups per phosphorus molecule. The reaction product in this case is a higher molecular weight polyphosphate:

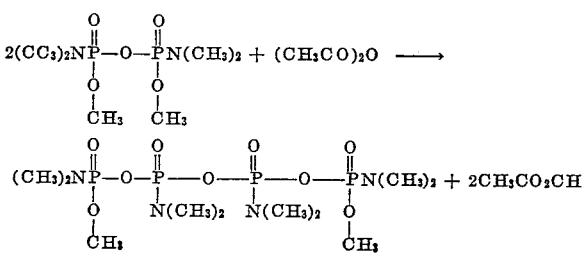

This reaction is applicable to all alkylamidophosphates and organic acid anhydrides.

An object of this invention is to provide a new process for the production of amidopyrophosphates. Another object of this invention is the formation of higher molecular weight polyphosphates. A further object is the inexpensive production of useful nitrogen-phosphorus compounds. Another object is the production of insecticides containing amidopyrophosphates. Other objects of this invention will appear hereinafter.

The conditions for running the reaction consist of mixing the desired quantities of alkylamidophosphate and organic acid anhydride and heating until the required amount of the organic acid ester is formed. In general, it is preferable to distill the ester in the reaction mixture as rapidly as it is formed, therefore, driving the reaction to completion. The reaction is greatly speeded up by the addition of a small amount of catalyst. Organic and inorganic acids may be used for this purpose, and in addition, anhydrides, esters, boron trifluoride and boron trifluoride etherate, are very effective catalysts.

The invention will be further illustrated by the following examples.

Example 1

One mole of methyl-bis-(N,N-dimethylamido)-phosphate, 0.5 mole of acetic anhydride and a trace of boron trifluoride etherate were placed in a distillation flask. The reaction material was heated in an oil bath at 175–180° C. for 3 hours. At the end of this time, 1 mole of methyl acetate distilled from the reaction mixture. The remaining product was a viscous, clear liquid which was predominantly octamethylpyrophosphoric-tetramide.

Example 2

Three moles of dimethyl N,N-dimethylamidophosphate, 2 moles of acetic anhydride and a trace of tributyl borate were placed in a distillation flask. The reaction mixture was heated in an oil bath at 175–180° C. for 4.5 hours. At the end of this time 3.6 moles of methyl acetate had distilled from the reaction mixture. The reaction product was a light brown, viscous liquid which was predominantly the dimethyl ester of tris-(N,N-dimethylamido)-triphosphoric acid.

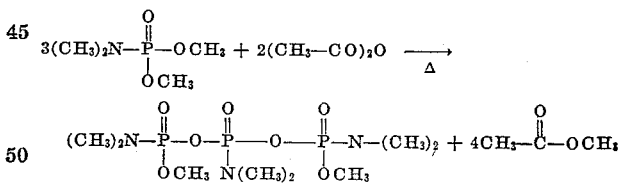

Example 3

One mole of butyl-bis-(N,N-diethylamido)-phosphate, 0.5 mole of acetic anhydride and a trace of sulfuric acid were placed in a distillation flask. The reaction mixture was heated at 180° C. for 6 hours. At the end of this time, 1 mole of butyl acetate had distilled from the reaction mixture. The reaction product was a light yellow, biscous liquid which was predominantly octaethylpyrophosphorictetramide.

In addition to the alklyamidophosphates and acid anhydrides which have been specifically mentioned above, I have discovered that the following compounds are operative in this reaction.

Butyl bis-(N,N-dimethylamido)-phosphate
Dibutyl N,N-dimethylamidophosphate
Ethyl bis-(N,N-diethylamido)-phosphate
Diethyl N,N-diethylamidophosphate
Ethyl bis-(N,N-dimethylamido)-phosphate
Diethyl N,N-dimethylamidophosphate
Diethyl bis-(N,N-diethylamido)-pyrophosphate Other lower organic acid anhydrides than acetic may be used. Propionic, butyric and the like are also operative.

Higher molecular weight polyphosphates which are prepared as illustrated above in Example 2 include the following: the dimethyl ester of tris-(N,N-dimethylamido)-triphosphoric acid, the dimethyl ester of tetra-(N,N-dimethylamido)-tetraphosphoric acid, and the diethyl ester of tri-(N,N-dimethylamido)-triphosphoric acid. However, this reaction is not limited to these compounds nor to starting compounds prepared by this reaction. For instance, I may use a dimethyl-bis-(N,N-dimethylamido)-pyrophosphate formed using one of the old methods found in the art, and using my invention, form the higher molecular polyphosphate.

The compounds of the present invention are useful in combating insecticide pests. For instance, these compounds may be employed as the active ingredient of an insecticidal composition including a carrier which may be a powder, a solvent or an emulsion to provide a combination as a dust, a solution or an emulsion.

The alkyl-substituted amidopyrophosphates herein disclosed are soluble in organic solvents such as carbon tetrachloride, alcohols such as ethyl, isopropyl and the like. These phosphorus compounds may also be dissolved or emulsified with the usual petroleum solvents used as carriers for insecticides.

The products of the present invention may also be mixed in various proportions with finely divided carrier solids such as powdered sulfur, with flour and other types of powders commonly used in insecticidal dusts.

The powders, solutions or emulsions may be applied to insect-infested vegetation by mechanical dusting or by atomizing the liquid solution or emulsion in the customary manner. When the present active compounds are employed in combination with solvents, dusts, or in emulsified form they maintain their high initial activity over a very broad range of dilutions and may be used without injury to the host plant.

The present alkyl amidopyrophosphates may be used as a substitute for nicotine or they may be combined with various nicotine salts in various proportions to obtain a combination insecticide having increased effectiveness against insect pests. The present products may also be combined with other insecticides, such as $\alpha,\alpha$-di(p-chlorophenyl)-$\beta,\beta,\beta$-trichlorethane (DDT) in various proportions.

The alkyl amidopyrophosphates formed are also useful as intermediates in the preparation of other compositions. The present phosphorus-nitrogen derivatives have been found to be valuable as solvents, particularly to dissolve acetylenic hydrocarbons. For example, acetylene or diacetylene may thereby be selectively removed from gas mixtures containing carbon dioxide and saturated hydrocarbons undesirable in an acetylene supply for chemical processing.

Since many changes could be made in the above methods and products without departing from the scope of the invention, it is intended that all matter contained in the above description shall be interpreted as illustrative and that my invention is not to be limited to the specific compositions and processes herein described, or specifically covered by my claims.

I claim:

1. The process of contacting at elevated temperatures alkylamidophosphates with lower fatty acid anhydrides to form alkyl-substituted amido pyrophosphates.

2. The process of reacting dimethyl N,N-dimethylamido-phosphate with acetic anhydride to form the dimethyl ester of tris-(N,N-dimethylamido)-triphosphoric acid.

References Cited in the file of this patent

UNITED STATES PATENTS

| | | |
|---|---|---|
| 2,587,549 | Trementozzi | Feb. 26, 1952 |
| 2,600,378 | Dickey et al. | June 17, 1952 |
| 2,610,139 | Dye | Sept. 9, 1952 |
| 2,668,837 | Tolkmith | Feb. 9, 1954 |

OTHER REFERENCES

B. I. O. S. report PB 8792 3–R, 1948, p. 25.